(12) United States Patent
Hengl et al.

(10) Patent No.: US 6,693,877 B1
(45) Date of Patent: Feb. 17, 2004

(54) DATA DISCARD AVOIDANCE METHOD

(75) Inventors: Terry L. Hengl, Phoenix, AZ (US);
Richard A. Bienz, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/390,746

(22) Filed: Sep. 7, 1999

(51) Int. Cl.[7] .............................................. H04L 12/26
(52) U.S. Cl. ....................................... 370/229; 370/316
(58) Field of Search ................................ 370/229, 235, 370/236, 237, 395.41, 395.42, 316

(56) References Cited

U.S. PATENT DOCUMENTS

| | | | | |
|---|---|---|---|---|
| 4,905,233 A | * | 2/1990 | Cain | |
| 5,241,533 A | * | 8/1993 | Kimoto | |
| 5,241,534 A | * | 8/1993 | Omuro | |
| 5,253,248 A | * | 10/1993 | Dravida | |
| 5,617,413 A | * | 4/1997 | Monacos | |
| 5,687,013 A | * | 11/1997 | Henmi | |
| 5,905,714 A | * | 5/1999 | Havansi | |
| 5,940,389 A | * | 8/1999 | Yang et al. | |
| 6,011,780 A | * | 1/2000 | Vaman | |
| 6,115,750 A | * | 9/2000 | Dillon | |
| 6,122,289 A | * | 9/2000 | Brown | |
| 6,215,765 B1 | * | 4/2001 | McAllister | |
| 6,236,642 B1 | * | 5/2001 | Shaffer | |
| 6,272,548 B1 | * | 8/2001 | Cotter et al. | |
| 6,301,352 B1 | * | 10/2001 | Chung | |
| 6,370,145 B1 | * | 4/2002 | Dally et al. | |

* cited by examiner

Primary Examiner—Chi Pham
Assistant Examiner—Andrew M. Waxman
(74) Attorney, Agent, or Firm—Frank J. Bogacz

(57) ABSTRACT

A method of avoiding the discarding of data in congested data networks includes receiving a data packet sent from a first station (15) to a first transceiver located in the data network. The data packet is designated to be forwarded to a second station (20) and the second station or a link, from a second transceiver to the second station, is temporarily busy. In this method the data packet is delayed by forwarding it from the first transceiver to a third transceiver (21) which is not busy and is forwarded back to the second station at a later time. Since it takes time to forward the data package through one or more other transceivers, the network operates to delay or store the data packet until the second station is no longer too busy.

19 Claims, 1 Drawing Sheet

DATA DISCARD AVOIDANCE METHOD

FIELD OF THE INVENTION

The present invention pertains to methods of avoiding the discarding of data packets in congested data networks.

BACKGROUND OF THE INVENTION

In present day communications systems, data is generally sent to remote sites or destinations by various paths or links. Some sites or destinations have a single access path or link to the network while other sites have multiple paths or links to the network. For example, in a satellite data network a communication path in the network originates at a ground station and data is sent through a plurality of space vehicles to a final space vehicle that sends the data to a destination ground station. The problem is that each space vehicle or other data reception equipment or channel has a limited capacity to handle data.

It is the nature of network traffic to be unpredictable with traffic volume flowing in peaks and valleys. To completely cover these peaks requires expensive hardware with capability that is under utilized the majority of the time. To satisfy customer requirements, the peaks of data must be handled or there is a high probability that the data may be dropped.

Assuming that the duration of the majority of these peaks are less than 40 ms or 50 ms, queuing or buffering the traffic during those peaks enables the traffic peak to be redistributed to a less loaded time, usually still meeting the time-out requirements. Generally, there is a predetermined time in which a data packet (data packets can include voice, video, email, etc.) must reach its destination or it simply expires. This time is generally much longer than the time required to reach the destination but it ensures that data packets which are lost or mis-sent eventually expire, rather than continuing to conjest and eventually jam the network. Increasing the size of memory buffers to handle data peaks is often the terrestrial solution. The problem with increasing the buffer size in space vehicles is the large investment in expensive radiation hardened hardware, which in turn increases the power and ultimately the weight and launch costs.

Packet switched communications networks, implementing multiple classes of service, typically control short-term congestion by discarding lower priority data packets when network buffers become full. Since space vehicles have limited data storage, data packets typically contain priority fields that are used by the space vehicle in network congested situations, to discard lower priority data packets to help alleviate the congestion. This leads to poor network throughput, since the originating ground terminal must resend the discarded packet after a time-out period. This can be a problem on terrestrial networks as well. The discarded data packet may be only one link away from its destination after traversing through numerous network nodes and using valuable resources along the network path. Thus, network performance suffers from these retransmissions.

BRIEF DESCRIPTION OF THE DRAWINGS

Referring to the drawings.

DESCRIPTION OF THE PREFERRED EMBODIMENTS

Figure 1:
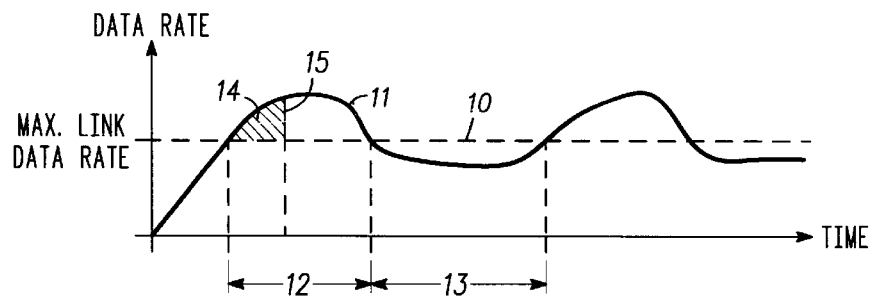
FIG. 1 is a graphical representation of typical traffic volume on a link versus time in a packet switched communications network.

Turning now to FIG. 1, a graphical representation is illustrated of typical traffic volume versus time for a link in a packet switched communications network (i.e. user aggregate data rate over a shared link of the network). While traffic throughout the network generally follows a very similar pattern, this simplified representation is intended to illustrate traffic in a single link to better explain the operation of the packet switched communications network in accordance with the present invention. The major axes of the graph represent data rate (increasing with the vertical axis) and time (increasing with the horizontal axis).

Connections in a data packet switch network are shared by multiple users. User packet volume is typically unpredictable and bursty. If numerous users offer a large amount of data packets to the network around the same instant, then packet volumes over the shared network links can be so large that they exceed the instantaneous data rate capacity of the connection (illustrated by a peak 11) unless the connections are sized to carry peak packet loads. Unfortunately, designing network connections for peak packet loads is a costly solution.

In one established method used to avoid the situation shown for peak 11 in FIG. 1, low cost digital memory devices are used in network nodes at each end of a connection or link. When the capacity of a network link is exceeded, excess data packets are placed in the node memory or queue until the congestion on the link subsides. Data packets are then retrieved from the queue and sent over the link. By using node queues, network connection capacities can be reduced to handle average packet volumes versus peak volumes.

There are instances when placing large amounts of memory in network nodes to smooth peak loads is undesirable. For example, if the network nodes are located in space (e.g. on a space vehicle). Unfortunately, digital memory devices designed for the space environment are typically not cheap and they consume power, a precious resource in space vehicles. Another example of when the use of queues is limited is in high data rate networks. The data rates on connections or links in these networks are so high that node memory quickly overflows for reasonable queue sizes.

Referring again to FIG. 1, a broken line, designated 10, indicates the maximum data rate that can be supported by a network link of a specific unit of the network. Peak 11 in the traffic, which has an interval 12, indicates a time during which more packets of data are being directed to the specific unit than the link can handle. Note that during interval 12, the connection capacity has been exceeded while in an interval 13, just after interval 12, the data rate is below the unit capacity. Also, an area 14, under curve 11 represents the node queue size. In prior art networks, or methods of handling data packets, low priority data packets which arrive at the specific unit during interval 12 are stored until the queue is full. When the queue becomes full, as represented by time 15 under curve 11, the unit starts to discard data packets.

A purpose of the present invention is to provide a discard prevention method for data packets that cannot be sent on specific network connections or links due to congestion (e.g. after time 15 during peak 11) and to simultaneously minimize the use of network node queues. Data packet discard prevention is accomplished by delaying the data packets received after time 15 until the data rate is below the unit capacity (e.g. interval 13). While a satellite data network is used in this specific example, it will be understood by those skilled in the art after reading the present disclosure, that the concept can be used in other data networks. Here it should be noted that, in the present data network, peak 11 (or area 14) generally has a time period or interval 12 of 20 milliseconds (msec) to 100 msec with the majority of the peaks being less than 40 ms or 50 ms. In other data networks, the time periods could be much larger.

Figure 2:
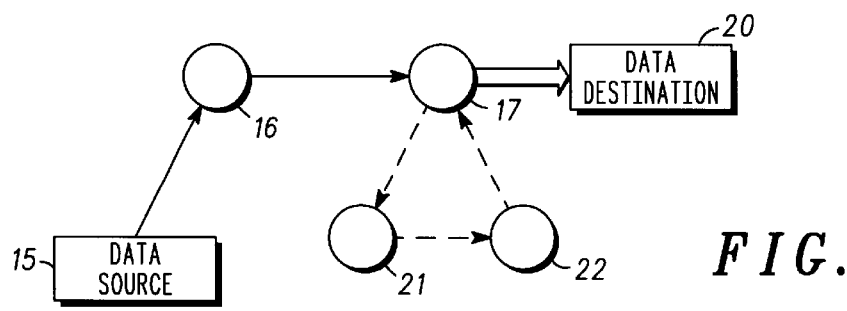
FIG. 2 is a schematic view of a traffic pattern for a destination with a single link to the network, illustrating a method of avoiding data discard in congested data networks in accordance with the present invention.

Turning now to FIG. 2, a first method of avoiding data discard of data packets in congested data networks is illustrated with specific reference to a satellite data network. In this method, a data packet from a data source, which originates at a ground station 15, is sent to a first space vehicle 16 in the network. In this description, the various units of equipment will be referred to as "transceivers", since each of them includes apparatus for receiving data packets and transmitting the data packets to a different destination, generally another space vehicle or a ground station. It will of course be understood by those skilled in the art that each of the space vehicles, ground stations, etc. also include a large amount of equipment for handling the data packets and routing them. Which additional equipment is not actually a part of this method and, accordingly, will not be discussed further.

The data packet is then sent from space vehicle 16 to a second space vehicle 17. The data packet is designated for forwarding to a second ground station 20 from space vehicle 17. However, the link from space vehicle 17 to ground station 20 is temporarily busy (see for example, traffic peak 11 of FIG. 1). Further, in this specific example the link from space vehicle 17 to ground station 20 is the only link in the network to ground station 20. In the present method of avoiding data discard in congested data networks, the data packet is forwarded to a third space vehicle 21, which is not busy (e.g. the traffic between space vehicle 17 and space vehicle 21 is in one of the valleys of the graph of FIG. 1). In typical satellite communications networks, as many as two thirds of the space vehicles are situated over water at any specific time so that they may have less traffic.

Space vehicle 21 can then forward the data packet directly back to space vehicle 17 or by way of one or more additional space vehicles such as space vehicle 22, depending upon the duration of the traffic peak in the link between space vehicle 17 and ground station 20. Generally, a time of approximately 20 msec is used in the transmission of the data packet from one space vehicle to an adjacent space vehicle for a low earth orbit constellation. This time would be larger for medium or geo synchronous satellites. Thus, forwarding the data packet from space vehicle 17 to space vehicle 21 and back to space vehicle 17 requires approximately 40 msec. Forwarding the data packet from space vehicle 17 to space vehicle 21, and then to space vehicle 22, and back to space vehicle 17 requires approximately 60 msec. By utilizing additional space vehicles which are not busy, virtually any delay time may be introduced into the transmission of the data packet so that it can eventually be forwarded to ground station 20, rather than being discarded.

Figure 3:
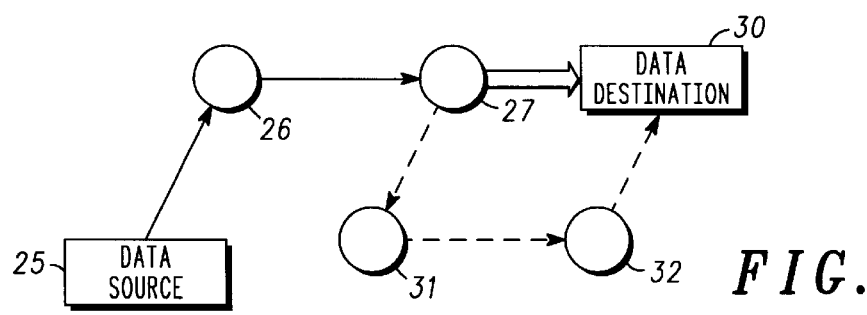
FIG. 3 is a schematic view of a traffic pattern for a destination with multiple links to the network, illustrating a method of avoiding data discard in congested data networks in accordance with the present invention.

Turning now to FIG. 3, another example of the present novel method of avoiding data discard in congested satellite data networks for delay tolerant packages is illustrated. In this example, a data packet from a data source, which originates at a ground station 25, is sent to a first space vehicle 26 in the network. The data packet is designated for forwarding to a second ground station 30 from a space vehicle 27. However, the link between space vehicle 27 and ground station 30 is temporarily busy (e.g. because ground station 30 is busy). In this specific example the network includes several links to ground station 30, for example a link from space vehicle 27 and a link from a space vehicle 32. The data packet is sent from space vehicle 26 to space vehicle 27 and, because ground station 30 is busy, the data packet is then forwarded to a space vehicle 31, which is not busy. As explained above, the forwarding to space vehicle 31 requires approximately 20 ms. Space vehicle 31 can then forward the data packet directly back to space vehicle 27 (assuming the traffic peak has passed) or to space vehicle 32, or by way of one or more additional space vehicles (depending upon the duration of the traffic peak at ground station 30) and thence on to ground station 30 after the traffic peak or at a time when ground station 30 is not busy.

Figure 4:
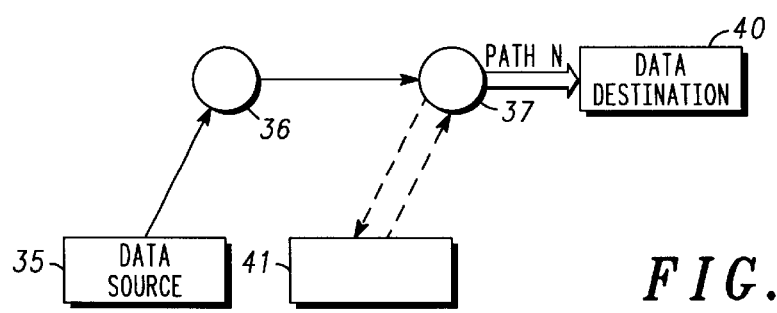
FIG. 4 is a schematic view of a traffic pattern for a destination in a network with user equipment or a special network storage node, illustrating a method of avoiding data discard in accordance with the present invention.

Turning now to FIG. 4, another method of avoiding data discard in congested satellite data networks for delay tolerant packages is illustrated. In this method, a data packet from a data source, which originates at a ground station 35, is sent to a first space vehicle 36 in the network. The data packet is designated for forwarding to a second ground station 40 from a space vehicle 37. However, the link from space vehicle 37 to ground station 40 is temporarily busy (see for example, traffic peak 11 of FIG. 1). The data packet is sent from space vehicle 36 to space vehicle 37 and, because the link from space vehicle 37 to ground station 40 is busy, the data packet is then forwarded to user equipment or a special network storage node 41, which is not busy. The data packet can be conveniently stored in node 41 until the link from space vehicle 37 to ground station 40 becomes less congested or it can be automatically forwarded to space vehicle 37 after a fixed or random time interval. Here it should be understood that user equipment node 41 can be any convenient piece of user equipment, including a ground station or personal transceiver, which is activated but not in use. Since it is relatively inexpensive to equip ground stations or terminals with large memories and powerful processing capability, this method is relatively inexpensive even if storage is used.

Thus new and improved methods of avoiding data discard of data packets in congested data networks is disclosed. In a specific example incorporated into a satellite data network, the method utilizes satellites, or space vehicles, in the network over low population or ocean areas. These satellites are usually operating well below their capacity. Data packets can be transmitted to these satellites and stored (using the data buffer) or immediately returned for processing. Since the data can be sent out as it comes in, and it returns at a later time, the network is being used as a large storage facility. This additional capability is established without the need to add any additional hardware or complex algorithms. Generally, the nature of the network routing allows the data packets to be transmitted to another space vehicle and it will continue on its destination automatically, without any special processing or handling.

It should be understood that the disclosed methods of providing delay in data transmissions can be used in a variety of networks. The preferred network is a satellite data network because adding additional memory and/or equipment to space vehicles is extremely costly and inconvenient. However, it is conceivable that a large amount of data can be intentionally stored in any network using the above described techniques. For example, the described techniques could be used on broadcast video traffic to supplement the existing buffering to reduce jitter.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of avoiding discard of data packets in a congested data network including first, second, and third transceivers comprising the steps of:

receiving a data packet to be forwarded to the second transceiver, wherein the second transceiver is a temporarily busy destination because a link from the second transceiver is temporarily busy; and delaying the data packet by forwarding the data packet to the third transceiver, which is not busy and forwarding the data packet from the third transceiver back to the second transceiver at a later time.

2. A method of avoiding discard of data packets in the congested data network as claimed in claim 1 wherein the step of delaying the data packet by forwarding the data packet to the third transceiver includes sequentially forwarding the data packet to a plurality of different interim destinations.

3. A method of avoiding discard of data packets in the congested data network as claims in claim 1 where the congested data network is a satellite network and in the step of delaying the data packet by forwarding the data packet to the third transceiver, the third transceiver includes one of a space vehicle, a ground station network node, or a personal transceiver.

4. A method of avoiding discard of data packets in the congested data network as claimed in claim 1 where the congested data network is a high data rate network and in the step of delaying the data packet by forwarding the data packet to the third transceiver, the third transceiver includes a network node.

5. A method of avoiding discard of data packets in the congested data network as claimed in claim 1 wherein the step of delaying the data packet by forwarding the data packet to the third transceiver includes forwarding the data packet from the first transceiver to the third transceiver which is not busy in the congested data network.

6. A method of avoiding discard of data packets in the congested data network as claimed in claim 5 where, in the step of delaying the data packet by forwarding the data packet from the first transceiver to the third transceiver in the congested data network, the third transceiver includes a node with storage facilities.

7. A method of avoiding discard of data packets in the congested data network as claimed in claim 1 wherein the step of delaying the data packet by forwarding the data packet to the third transceiver includes sequentially forwarding the data packet to a plurality of different interim transceivers in the congested data network.

8. A method of avoiding discard of data packets in a congested data network comprising the steps of:

receiving a data packet at a first transceiver in the data network, the data packet being designated to be forwarded to a second transceiver, the second transceiver being temporarily busy;

delaying the data packet by forwarding the data packet from the first transceiver through the second transceiver to a third transceiver which is not busy in the congested data network;

receiving the data packet at the third transceiver in the congested data network; and delaying the data packet by forwarding the data packet to the second transceiver when the second transceiver is no longer busy.

9. A method of avoiding discard of data packets in the congested data network as claimed in claim 8 wherein the first, second, and third transceivers are located in space vehicles and a link from the second transceiver to a ground station is temporarily busy.

10. A method of avoiding discard of data packets in the congested data network as claimed in claim 8 wherein the step of delaying the data packet by forwarding the data packet to the second transceiver includes delaying the data packet by forwarding the data packet through at least a fourth transceiver.

11. A method of a voiding discard of data packets in the congested data network as claimed in claim 8 wherein the step of delaying the data packet by forwarding the data packet from the first transceiver through the second transceiver to the third transceiver which is not busy in the congested data network includes delaying the data packet by sequentially forwarding the data packet to a plurality of different interim transceivers.

12. A method of avoiding discard of data packets in the congested data network as claimed in claim 8 where the congested data network is a satellite network and in the step of delaying the data packet by forwarding the data packet from the first transceiver through the second transceiver to the third transceiver in the congested data network, the third transceiver includes one of a space vehicle, a ground station network node, or a personal transceiver.

13. A method of avoiding discard of data packets in the congested data network as claimed in claim 8 where, in the step of delaying the data packet by forwarding the data packet from the first transceiver through the second transceiver to the third transceiver in the congested data network, the third transceiver includes a node with storage facilities.

14. A method of avoiding discard of data packets in a congested satellite data network comprising the steps of:

receiving a data packet from a first ground station at a first transceiver located on a space vehicle in the congested satellite data network, the data packet being designated to be forwarded to a second ground station, a link from a second transceiver located on a space vehicle to the second ground station being temporarily busy;

delaying the data packet by forwarding the data packet from the first transceiver to a third transceiver which is not busy in the congested satellite data network;

receiving the data packet at the third transceiver in the congested satellite data network at a later time; and delaying the data packet by forwarding the data packet to the second ground station when the second ground station is no longer busy.

15. A method of avoiding discard of data packets in the congested satellite data network as claimed in claim 14 wherein the step of delaying the data packet by forwarding the data packet from the first transceiver to the third transceiver includes delaying the data packet by forwarding the data packet through the second transceiver to the third transceiver.

16. A method of avoiding discard of data packets in the congested satellite data network as claimed in claim 15 wherein the step of delaying the data packet by forwarding the data packet to the second ground station includes delaying the data packet by forwarding the data packet through at least a fourth transceiver.

17. A method of avoiding discard of data packets in the congested satellite data network as claimed in claim 15 wherein the link from the second transceiver to the second ground station is an only link to the second ground station and the step of delaying the data packet by forwarding the data packet to the second ground station includes delaying the data packet by forwarding the data packet to the second transceiver at a later time.

18. A method of avoiding discard of data packets in the congested satellite data network as claimed in claim 15 wherein the congested satellite data network includes another link from the second ground station to the third transceiver and the step of delaying the data packet by forwarding the data packet to the second ground station at a later time includes delaying the data packet by forwarding the data packet from the third transceiver to the second ground station when the second ground station is no longer busy.

19. A method of avoiding discard of data packets in the congested satellite data network as claimed in claim 18 wherein the step of delaying the data packet by forwarding the data packet from the first transceiver to the third transceiver in the satellite data network includes delaying the data packet by forwarding the data packet through at least one additional transceiver in the congested satellite data network.

\* \* \* \* \*